US009988016B1

(12) United States Patent
Bianchi, III et al.

(10) Patent No.: US 9,988,016 B1
(45) Date of Patent: Jun. 5, 2018

(54) AUTHENTICATION OF MOBILE DEVICES FOR VEHICLE COMMUNICATION

(71) Applicant: Ford Global Technologies, LLC, Dearborn, MI (US)

(72) Inventors: Arthur Thomas Bianchi, III, Sterling Heights, MI (US); Kevin F. Militello, South Lyon, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/372,369

(22) Filed: Dec. 7, 2016

(51) Int. Cl.
*G05B 19/00* (2006.01)
*B60R 25/24* (2013.01)
*H04W 12/06* (2009.01)
*H04W 12/02* (2009.01)
*H04L 29/08* (2006.01)

(52) U.S. Cl.
CPC ............ *B60R 25/24* (2013.01); *H04W 12/02* (2013.01); *H04W 12/06* (2013.01); *H04L 67/125* (2013.01)

(58) Field of Classification Search
CPC .............................. B60R 25/24; B60R 25/241
USPC .......................... 340/5.2, 5.61, 10.33, 10.34
See application file for complete search history.

(56) References Cited

U.S. PATENT DOCUMENTS

| | | | |
|---|---|---|---|
| 6,658,328 B1 * | 12/2003 | Alrabady | G07C 9/00309 307/10.2 |
| 7,084,734 B2 | 8/2006 | Singh | |
| 7,446,644 B2 | 11/2008 | Schaffzin et al. | |
| 8,045,961 B2 | 10/2011 | Ayed et al. | |
| 8,053,922 B2 | 11/2011 | Muller | |
| 8,284,020 B2 * | 10/2012 | Ghabra | B60R 25/245 340/5.61 |
| 8,811,900 B2 | 8/2014 | Kirsch et al. | |
| 9,008,917 B2 | 4/2015 | Gautama et al. | |
| 9,168,927 B2 | 10/2015 | Louboutin | |
| 9,241,235 B2 * | 1/2016 | Santavicca | H04W 4/008 |
| 2009/0153294 A1 | 6/2009 | Katagiri | |
| 2010/0052931 A1 | 3/2010 | Kolpasky | |
| 2010/0304690 A1 | 12/2010 | Proefke et al. | |
| 2012/0331304 A1 * | 12/2012 | She | G06F 21/85 713/189 |
| 2014/0049361 A1 | 2/2014 | Ahearn | |
| 2014/0253288 A1 | 9/2014 | O'Brien et al. | |
| 2014/0255036 A1 * | 9/2014 | Jovicic | H04B 10/116 398/115 |
| 2014/0274223 A1 | 9/2014 | Kleve et al. | |
| 2015/0026648 A1 * | 1/2015 | Wu | G06F 1/1626 715/863 |
| 2015/0028995 A1 | 1/2015 | Gautama | |
| 2015/0161834 A1 | 6/2015 | Spahl et al. | |

(Continued)

*Primary Examiner* — Carlos E Garcia
(74) *Attorney, Agent, or Firm* — James P. Muraff; Neal, Gerber & Eisenberg LLP

(57) ABSTRACT

Methods and apparatus are disclosed for authentication of mobile devices for vehicle communication. An example mobile device for vehicle communication authentication a communication module to receive a signal from a vehicle, memory including an application for accessing digital keys, and key accessor. The example key accessor is to activate, in response to determining the application is inactive, the application utilizing the signal. The example key accessor also is to access a key via the application and send, via the communication module, the key to the vehicle.

20 Claims, 4 Drawing Sheets

(56) References Cited

U.S. PATENT DOCUMENTS

| | | |
|---|---|---|
| 2015/0258962 A1 | 9/2015 | Khanu |
| 2015/0291126 A1 | 10/2015 | Nicholls et al. |
| 2016/0063786 A1 | 3/2016 | Lewis et al. |
| 2016/0217676 A1 | 7/2016 | Kurtovic |
| 2016/0358396 A1* | 12/2016 | Spiess ................ G07C 9/00309 |
| 2016/0358397 A1 | 12/2016 | Kristensen |

* cited by examiner

AUTHENTICATION OF MOBILE DEVICES FOR VEHICLE COMMUNICATION

CROSS REFERENCE TO RELATED APPLICATION

This application is related to U.S. application Ser. No. 15/372,376, filed on Dec. 7, 2016, which is incorporated herein by reference in its entirety.

TECHNICAL FIELD

The present disclosure generally relates to communication authentication and, more specifically, authentication of mobile devices for vehicle communication.

BACKGROUND

Oftentimes, a vehicle utilizes a remote keyless entry system to enable a user (e.g., a driver) to unlock and/or open a door without inserting a key into a lock. In some instances, the remote keyless entry system includes a key fob that is carried by the user. The key fob includes a wireless transducer that communicates with the vehicle to unlock and/or open the door of the vehicle. Some remote keyless entry systems are passive entry systems that unlock and/or open the door of the vehicle upon detecting that the key fob is within a proximity of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for authentication of mobile devices for vehicle communication. An example disclosed mobile device for vehicle communication authentication includes a communication module to receive a signal from a vehicle, memory including an application for accessing digital keys, and key accessor. The example key accessor is to activate, in response to determining the application is inactive, the application utilizing the signal. The example key accessor also is to access a key via the application and send, via the communication module, the key to the vehicle.

An example disclosed method for mobile device authentication for vehicle communication includes receiving, via a mobile device, a signal that is associated with a vehicle and determining, via a processor, whether an application for accessing a key is active on the mobile device. The example disclosed method also includes activating, in response to determining the application is inactive, the application utilizing the signal. The example disclosed method also includes accessing the key via the application and sending the key to the vehicle via a communication module.

An example disclosed system for mobile device authentication for vehicle communication includes a mobile device to receive a signal and activate, in response to determining an application for accessing digital keys is inactive, the application on the mobile device utilizing the signal. The example mobile device also is to access a key via the application. The example disclosed system also includes a vehicle to broadcast the signal, receive the key from the mobile device, and determine whether to authenticate the mobile device based on the key.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
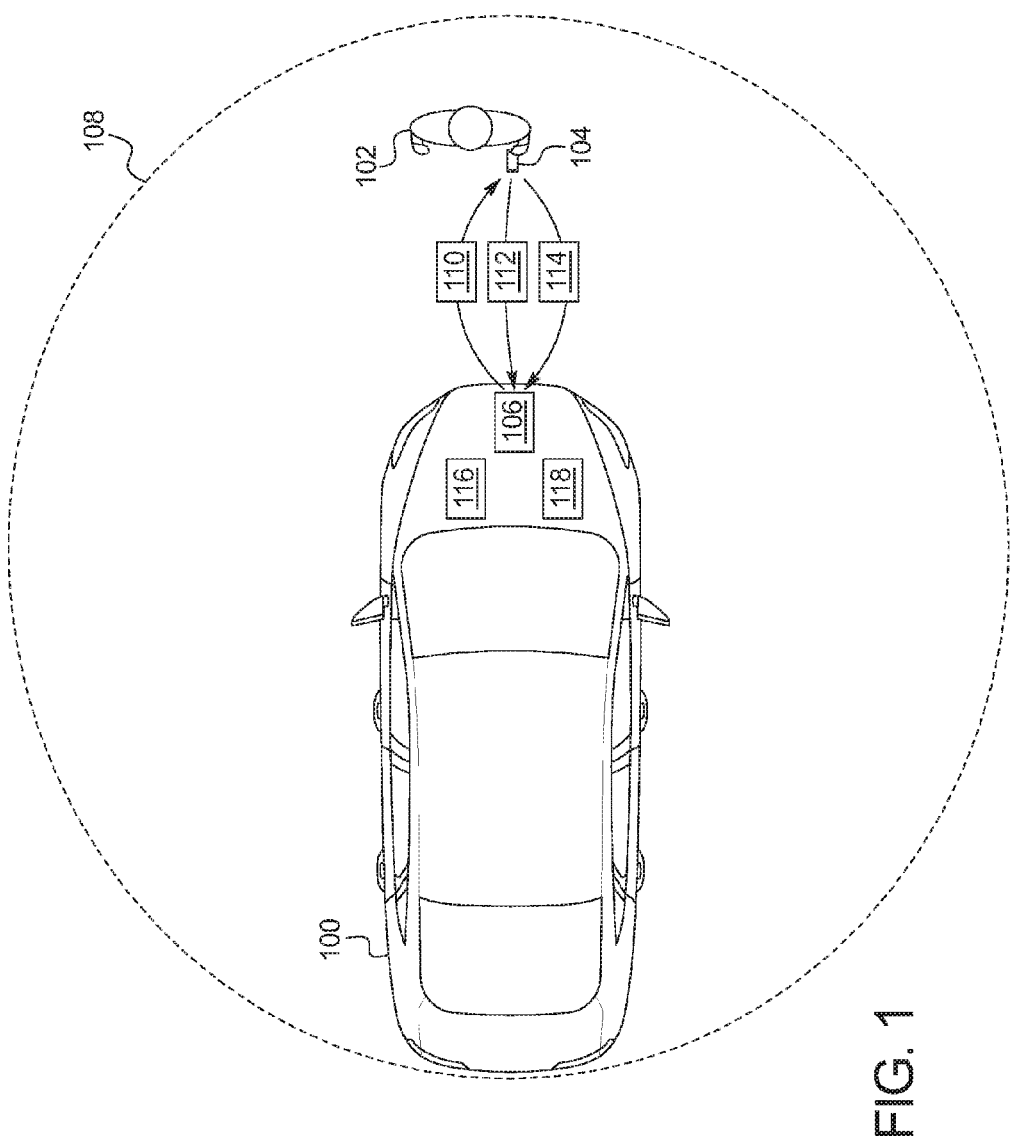
FIG. 1 illustrates an example vehicle and an example mobile device in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles oftentimes include remote keyless entry systems to enable a user (e.g., a driver) to unlock and/or open a vehicle door without inserting a key into a lock. Some remote keyless entry systems are passive entry systems in which the vehicle unlocks and/or opens the vehicle door upon detecting that the user is within proximity of the vehicle. In some instances, the passive entry system utilizes a key fob that is carried by the user and in communication with the vehicle to detect the proximity of the user to the vehicle. In other instances, the passive entry system utilizes an application operating on a mobile device (e.g., a smart phone) of the user that communicates with the vehicle to detect the proximity of the user to the vehicle. In some instances, the passive entry system may require that the mobile device is authenticated by the vehicle to prevent unauthorized users from accessing the vehicle. In some such instances, the vehicle may be unable to authenticate the mobile device if the application is not operating on the mobile device, thereby preventing the passive entry system from unlocking and/or opening the vehicle door for the user.

Examples disclosed herein include a passive entry system in which an inactive passive entry application of a mobile device (e.g., a smart phone, a tablet, a smart watch, a wearable, etc.) is activated as a user approaches a vehicle without user interaction to enable a vehicle to authenticate, via the application, communication between the mobile device and the vehicle.

As used herein, an "application" and an "app" refer to a program installed on a device (e.g., a mobile device) that is designed to perform a particular set of functions, tasks, or activities. As used herein, an "inactive" application refers to an application that is installed on a device for which an operating system of the device is not currently running or executing instructions. As used herein, an "active" application refers to an application installed on a device for which an operating system of the device is currently running or executing instructions. Active applications include foreground applications and background application. As used herein, a "foreground application" refers to an active application that is providing an interface with a user (i.e., the application is running on a foreground of the device). As used herein, a "background application" refers to an active application that is not providing an interface with a user (i.e., the application is running in a background of the device). As used herein, "activating" or "to activate" an application refers to causing an operating system of a device to start performing or executing instructions for the application. As used herein, "authenticating" or "to authenticate" refers to validating or permitting one device (e.g., a mobile device) to communicate with another device (e.g., a vehicle).

The mobile device of the examples disclosed herein receives a signal when the mobile device is nearby or proximate to the vehicle. The mobile device includes memory that includes an application for accessing digital keys (e.g., encryption keys). The mobile device also includes a key accessor that determines whether the application is active and, in response to determining that the application is inactive, activates the application utilizing the signal as a prompt. Further, the key accessor accesses a key via the application and sends the key to the vehicle via a communication module of the mobile device.

In some examples, the key accessor activates the application, the key accessor accesses the key and/or the communication module sends the key to the vehicle when the mobile device is in a locked mode. As used herein, a "locked mode" refers to a mode of a mobile device in which a user must unlock the mobile device (e.g., via a password, fingerprint and/or any other verification user-verification means) to interact with an application of the mobile device. Further, the key accessor of the mobile device may access the key from a database. In some examples, the database is stored on the mobile device. In other examples, the key accessor accesses the key from a network (e.g., the Internet) via a second communication module of the mobile device.

The vehicle of the examples disclosed herein includes a communication module that receives the key sent from the mobile device and a device authenticator that determines whether to authenticate the mobile device by evaluating the key. In some examples, the device authenticator compares the key to key entries of a vehicle database and authenticates the mobile device when the key received from the mobile device matches one of the key entries of the vehicle database. Additionally or alternatively, the device authenticator hashes the key received from the mobile device to produce a hashed key, compares the hashed key to key entries of a vehicle database, and authenticates the mobile device when the hashed key matches one of the key entries of the vehicle database.

In response to the device authenticator authenticating the mobile device, the device authenticator permits the communication module of the vehicle to receive a message from the mobile device, for example, to prime the vehicle for passive entry by an approaching user. As used herein, "priming a vehicle" and "to prime a vehicle" refer to initiating one or more systems and/or devices of a vehicle to facilitate entry of the vehicle by a user. For example, priming the vehicle includes unlocking, opening, and/or priming one or more doors of the vehicle and/or activating lighting of the vehicle for an approaching user. As used herein, "priming a door" refers to instructing an electronic latch to unlock a corresponding door upon detection that a user has attempted to open a door (e.g., by touching a handle of the door).

In some examples, the communication module of the mobile device receives the signal that is utilized to activate the application when the mobile device is within a proximity range of the vehicle. In some such examples, the communication module of the mobile device is a short-range wireless module, the communication module of the vehicle is a short-range wireless module, and the signal is a low-energy beacon (e.g., a Bluetooth® low-energy beacon) that is broadcasted by the short-range wireless module of the vehicle and received by the short-range wireless module of the mobile device. As used herein, a "beacon" is a signal that is intermittently broadcasted by a source.

In some examples, the vehicle includes a GPS receiver that identifies a location of the vehicle, and the mobile device includes a GPS receiver that identifies a location of the vehicle. In some such examples, the GPS receiver of the mobile device receives the signal that is utilized to activate the application when the mobile device is within a proximity range of the vehicle. The GPS receiver of the mobile device may receive the signal when the location identified by the GPS receiver of the mobile device is near or proximate to the location identified by the GPS receiver of the vehicle.

Turning to the figures, FIG. 1 illustrates an example vehicle 100 and a user 102 with an example mobile device 104 (e.g., a smart phone, a tablet, a smart watch, a wearable, etc.) in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

The vehicle 100 of the illustrated example includes a communication module 106 that is to communicatively couple to the mobile device 104. In the illustrated example, the communication module 106 is a short-range wireless module that includes a wireless transducer to wirelessly communicate with the mobile device 104 and/or another device that is within a broadcast range or distance of the communication module 106. The short-range wireless module includes hardware and firmware to establish a connection with the mobile device 104. In some examples, the short-range wireless module implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In the illustrated example, the vehicle 100 includes one communication module (e.g., the communication module 106). In other examples, the vehicle 100 includes a plurality of communication modules that are to communication with the mobile device 104 and are positioned at different locations throughout the vehicle 100.

As illustrated in FIG. 1, the broadcast range of the communication module 106 defines a proximity range 108 of the vehicle 100 in which the communication module 106 is capable of communicating with the mobile device 104 and/or another device. For example, when the mobile device 104 is within the proximity range 108 of the vehicle 100, the mobile device 104 is able to receive a beacon 110 (e.g., a low-energy beacon such as Bluetooth® low-energy (BLE) beacon) that is broadcasted intermittently by the communication module 106 of the vehicle 100. When the mobile device 104 is outside of the proximity range 108, the mobile device 104 is unable to receive the beacon 110 broadcasted by the communication module 106. Thus, the communication module 106 of the vehicle 100 utilizes the beacon 110 to determine whether the mobile device 104 is proximate to (e.g., within the proximity range 108 of) the vehicle 100. In some examples, the beacon 110 is broadcasted by the communication module 106 at a constant rate (e.g., one broadcast per second). In other examples, a rate at which the communication module 106 broadcasts the beacon 110 is dependent upon a distance between the communication module 106 and the mobile device 104. For example, the communication module 106 may broadcast the beacon 110 at a greater rate the closer the mobile device 104 is to the vehicle 100.

The communication module 106 of the illustrated example also is capable of receiving a key 112 (e.g., a digital key, an encryption key) from the mobile device 104 when the mobile device 104 is within the proximity range 108 of the vehicle 100. The mobile device 104 sends the key 112 to the communication module 106 of the vehicle upon receiving the beacon 110 to enable the vehicle 100 to authenticate the mobile device 104 for further communication with the vehicle 100. For example, upon being authenticated by the vehicle 100, the mobile device 104 sends a message 114 that is received by the vehicle 100 as the user 102 approaches the vehicle 100. The message 114 may instruct the vehicle 100 to prime the vehicle 100 for passive entry by the user 102.

The vehicle 100 of the illustrated example also includes a global positioning sensor (GPS) receiver 116 to identify a location of the vehicle 100. For example, if the GPS receiver 116 is active (e.g., the vehicle 100 is powered on), the GPS receiver 116 identifies a current location of the vehicle 100. Otherwise, if the GPS receiver 116 is inactive (e.g., the vehicle 100 is powered off), the GPS receiver 116 may identify a last-known parked location of the vehicle 100. In some examples, the GPS receiver 116 is utilized to determine whether the mobile device 104 is proximate to the vehicle 100, for example, by comparing a location of the mobile device (e.g., identified via a GPS receiver 212 of the mobile device 104 of FIG. 2) to a location of the vehicle 100. Additionally or alternatively, an assisted GPS system and/or a received signal strength indicator (RSSI) is utilized to determine a distance between the mobile device 104 and the vehicle 100. For example, the communication module 106 receives the RSSI from the mobile device 104 when the mobile device 104 is within the proximity range 108 of the vehicle 100.

The vehicle 100 also includes a device authenticator 118 that authenticates the mobile device 104 and/or any other device to facilitate further communication between the vehicle 100 and the mobile device 104 and/or the other device. The device authenticator 118 is communicatively coupled to the communication module 106 to receive the key 112 and/or the message 114 sent by the mobile device 104.

In operation, the vehicle 100 sends a signal that the mobile device 104 is to receive when the mobile device 104 is proximate to the vehicle 100. In some examples, the communication module 106 (e.g., a short-range wireless module) broadcasts a low-energy beacon that is received by a communication module (e.g., a communication module 210 of FIG. 2) of the mobile device 104 when the mobile device 104 is within the proximity range 108 of the vehicle 100. Additionally or alternatively, the mobile device 104 receives a geosense signal associated with the vehicle 100 when the mobile device 104 is proximate to the vehicle 100. The geosense signal is a global-positioning signal that is sent to a device (e.g., the mobile device 104) when that device is within a proximity range of another device (e.g., within the proximity range 108 of the vehicle 100).

Upon receiving the signal from the vehicle 100, the mobile device 104 determines whether an application for accessing securely-stored, digital keys is active on the mobile device 104. The application may be inactive as the user 102 approaches the vehicle 100, for example, if the user 102 turned off the mobile device, the mobile device 104 ran out of battery, the user 102 closed the application, etc. without subsequently reactivating the application.

In response to determining that the application is inactive, the mobile device 104 activates the application utilizing the received signal that is associated with the mobile device 104 being proximate to the vehicle 100 (e.g., the beacon 110) as a prompt. For example, the mobile device 104 utilizes the signal associated with the vehicle 100 to activate the application without user interaction between the user 102 and the application of the mobile device 104. The mobile device 104 may activate the application utilizing the received signal when the mobile device 104 is in a locked mode to facilitate activation of the application without user interaction between the user 102 and the mobile device 104.

After the application is activated, the mobile device 104 accesses the key 112 via the application and sends the key 112 to the communication module 106 of the vehicle 100 to enable the device authenticator 118 to authenticate the mobile device 104 for further communication. The application may access and send the key 112 to the vehicle 100 when the application is operating as a background application or a foreground application on the mobile device 104. Additionally or alternatively, the application accesses and send the key 112 to the vehicle 100 without user interaction between the user 102 and the mobile device 104. For example, the mobile device 104 may activate the application, accesses the key 112, and sends the key 112 to the communication module 106 of the vehicle 100 while the mobile device 104 remains in the locked mode. By enabling the mobile device 104 to access and send the key 112 without user interaction between the user 102 and the mobile device 104, the application of the mobile device 104 enables the mobile device to operate as a wireless key in a passive entry system of the vehicle 100.

The communication module 106 of the vehicle 100 receives the key 112 sent from the mobile device 104, and the device authenticator 118 determines whether to authenticate the mobile device 104 for further communication with the vehicle 100. For example, the device authenticator 118 evaluates the key 112 received from the mobile device 104 to determine whether to authenticate the mobile device 104. For example, the device authenticator 118 authenticates the mobile device 104 for communication with the vehicle 100 by comparing the key 112 sent by the mobile device 104 to key entries of a database (e.g., a database 314 of FIG. 3) that is accessible to the device authenticator 118. The device authenticator 118 authenticates the mobile device 104 for further communication with the vehicle 100 when the key 112 received from the mobile device 104 matches one of the key entries of the database. In some examples, the device authenticator 118 hashes, via a hash function, the key 112 received from the mobile device 104 into a hashed key. In such examples, the device authenticator 118 compares the hashed key to the key entries of the database and authenticates the mobile device 104 when the hashed key matches one of the key entries of the database.

When the device authenticator 118 authenticates the mobile device 104, the device authenticator 118 enables the communication module 106 of the vehicle 100 to receive the message 114 from the mobile device 104. For example, the communication module 106 of the vehicle 100 receives the message 114 to receive instructions from the mobile device 104 to prime the vehicle 100 for passive entry by the user 102 approaching the vehicle 100.

Figure 2:
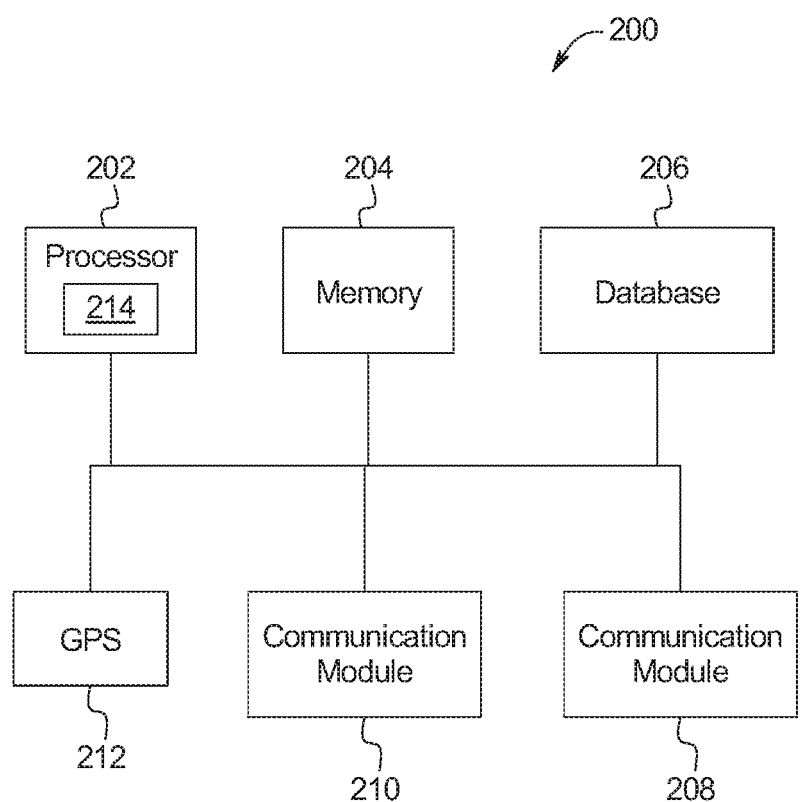
FIG. 2 is a block diagram of electronic components of the mobile device of FIG. 1.

FIG. 2 is a block diagram of electronic components 200 of the mobile device 104. As illustrated in FIG. 2, the electronic components 200 include a microcontroller unit, controller, or processor 202. Further, the electronic components 200 include memory 204, a database 206, a communication module 208, a communication module 210, and a GPS receiver 212.

In the illustrated example, the processor 202 of the mobile device 104 is structured to include a key accessor 214. The processor 202 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 204 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 204 includes multiple kinds of memory, particularly volatile memory and non-volatile memory.

The memory 204 is computer readable media on which one or more sets of instructions, such as the software for operating the methods of the present disclosure, can be embedded. The instructions may embody one or more of the methods or logic as described herein. For example, the memory 204 includes computer readable memory on which instructions for the application for accessing digital keys are embedded. The instructions may reside completely, or at least partially, within any one or more of the memory 204, the computer readable medium, and/or within the processor 202 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The electronic components 200 of the illustrated example includes the database 206 that securely stores a plurality of keys that may be utilized to authenticate the mobile device 104 for communication with the vehicle 100. Additionally or alternatively, the electronic components 200 include the communication module 208 that is communicatively coupled to a network (e.g., the Internet). In some such examples, the network includes a database that securely stores a plurality of keys for authentication of the mobile device 104 by the vehicle 100.

In the illustrated example, the electronic components 200 also includes the communication module 210 that is to communicatively couple to the communication module 106 of the vehicle 100. For example, the communication module 210 receives the beacon 110 (e.g., a low-energy beacon) broadcasted by the communication module 106 of the vehicle 100 and sends the key 112 and the message 114 to the communication module 106. In some examples, the communication module 106 is a short-range wireless module that includes a wireless transducer to wirelessly communicate with the communication module 106 of the vehicle 100. The short-range wireless module includes hardware and firmware to establish a connection with the mobile device 104. In some examples, the short-range wireless module implements the Bluetooth® and/or Bluetooth® Low Energy (BLE) protocols.

The GPS receiver 212 of the electronic components identifies a location of the mobile device 104. Additionally, the GPS receiver 116 may be utilized to determine whether the mobile device 104 is proximate to the vehicle 100. For example, when the mobile device 104 is proximate to the vehicle 100, the mobile device 104 receives a geosense signal associated with the vehicle 100 that indicates the mobile device 104 is within the proximity range 108 of the vehicle 100.

In operation, the mobile device 104 receives the signal associated with the vehicle 100 when the mobile device 104 is proximate to the vehicle 100. For example, the communication module 210 receives the beacon 110 that is broadcasted by the communication module 106 of the vehicle 100. Additionally or alternatively, the GPS receiver 212 of the mobile device 104 receives the geosense signal when the mobile device 104 is proximate to the vehicle 100. Upon receiving the signal associated with the vehicle 100, the key accessor 214 of the processor 202 determines whether the application for accessing digital keys is active. In response to determining that the application is inactive, the key accessor 214 activates the application utilizing the signal as a prompt.

Once the application is active, the key accessor 214 utilizes the application to access the key 112. In some examples, the key accessor 214 accesses, via the application, the key 112 from the database 206. Alternatively, the key accessor 214 utilizes the application and the communication module 208 to access the key 112 from a database stored on a network (e.g., the Internet). Subsequently, the key accessor 214 sends the key 112 to the communication module 106 of the vehicle 100 via the communication module 210 of the mobile device 104. In some examples, the key accessor 214 activates the application, accesses the key 112, and/or sends the key 112 to the vehicle 100 when the mobile device is in a locked mode. Further, after the key accessor 214 sends the key 112 to the communication module 106 of the vehicle 100, the communication module 210 of the mobile device 104 sends the message 114 to the communication module 106 of the vehicle 100. For example, the communication module 210 sends the message 114 to the communication module 106 to prime the vehicle 100 for the user 102.

Figure 3:
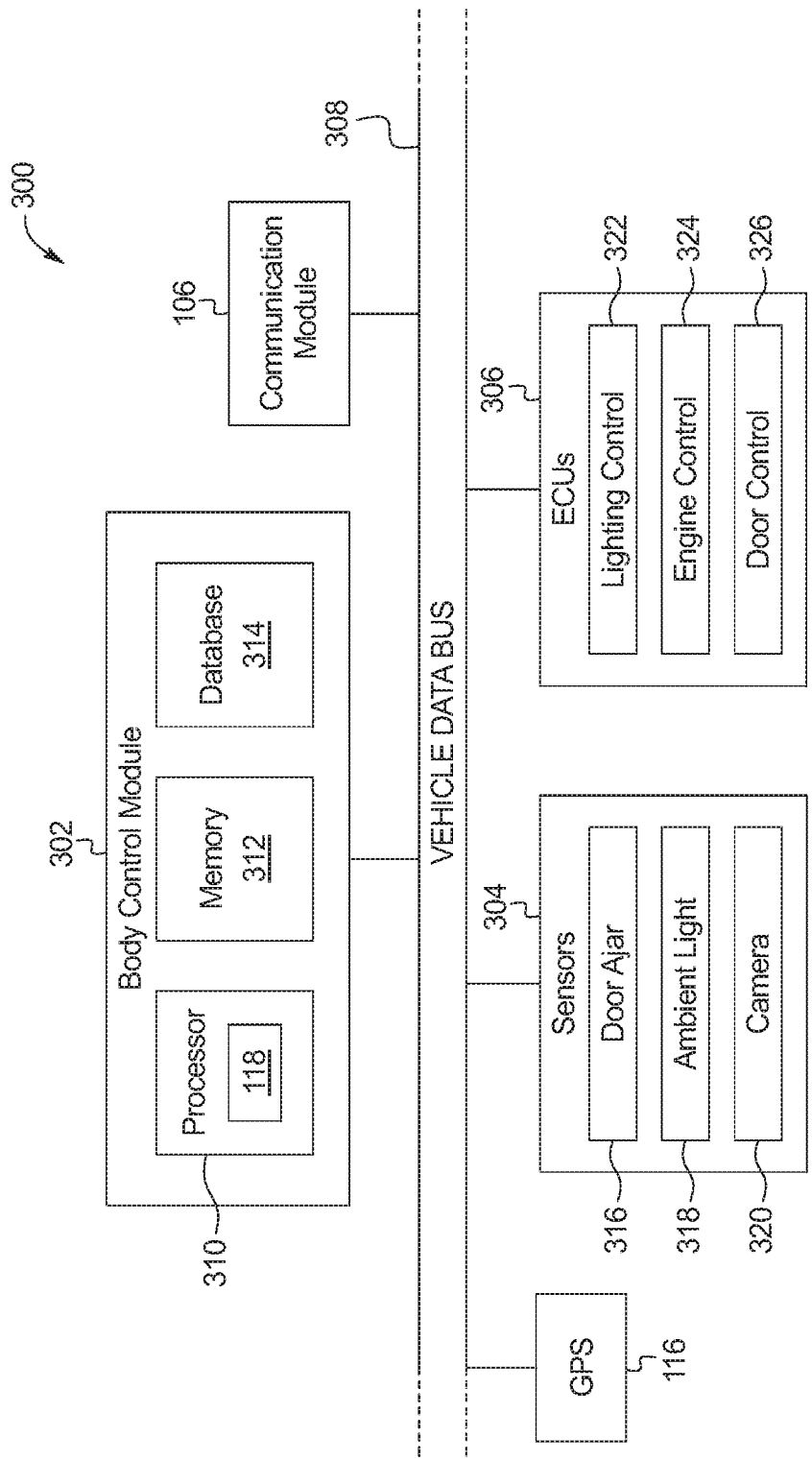
FIG. 3 is a block diagram of electronic components of the vehicle of FIG. 1.

FIG. 3 is a block diagram of electronic components 300 of the vehicle 100. As illustrated in FIG. 3, the electronic components 300 include a body control module 302, the communication module 106, the GPS receiver 116, sensors 304, electronic control units (ECUs) 306, and a vehicle data bus 308.

The body control module 302 controls one or more subsystems throughout the vehicle 100, such as external lighting, power windows, an immobilizer system, power mirrors, etc. For example, the body control module 302 includes circuits that drive one or more of relays (e.g., to control wiper fluid, etc.), brushed direct current (DC) motors (e.g., to control power seats, power windows, wipers, etc.), stepper motors, LEDs, etc.

The body control module 302 includes a microcontroller unit, controller or processor 310 and memory 312. In some examples, the body control module 302 is structured to include the device authenticator 118. Alternatively, in some examples, the device authenticator 118 is incorporated into another electronic control unit (ECU) with its own processor 310 and memory 312. The processor 310 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 310 during execution of the instructions.

Further, the body control module 302 of the illustrated example includes a database 314 that includes a plurality of key entries. The device authenticator 118 compares the key entries of the database 314 to the key 112 and/or the hashed key to determine whether to authenticate the mobile device 104 for further communication with the vehicle 100.

The sensors 304 are arranged in and around the vehicle 100 to monitor properties of the vehicle 100 and/or an environment in which the vehicle 100 is located. One or more of the sensors 304 may be mounted to measure properties around an exterior of the vehicle 100. Additionally or alternatively, one or more of the sensors 304 may be mounted inside a cabin of the vehicle 100 or in a body of the vehicle 100 (e.g., an engine compartment, wheel wells, etc.) to measure properties in an interior of the vehicle 100. For example, the sensors 304 include accelerometers, odometers, tachometers, pitch and yaw sensors, wheel speed sensors, microphones, tire pressure sensors, biometric sensors and/or sensors of any other suitable type. In the illustrated example, the sensors 304 include a door-ajar sensor 316, an ambient light sensor 318, and a camera 320. For example, the door-ajar sensor 316 detects whether a door of the vehicle 100 is open before and/or after the vehicle 100 is primed for passive entry by the user 102. The ambient light sensor 318 and/or the camera 320 may measure ambient light of the vehicle 100 to affect lighting (e.g., interior lighting, exterior lighting) of the vehicle 100 as the vehicle 100 is primed for entry by the user 102.

The ECUs 306 monitor and control the subsystems of the vehicle 100. For example, the ECUs 306 are discrete sets of electronics that include their own circuit(s) (e.g., integrated circuits, microprocessors, memory, storage, etc.) and firmware, sensors, actuators, and/or mounting hardware. The ECUs 306 communicate and exchange information via a vehicle data bus (e.g., the vehicle data bus 308). Additionally, the ECUs 306 may communicate properties (e.g., status of the ECUs 306, sensor readings, control state, error and diagnostic codes, etc.) to and/or receive requests from each other. For example, the vehicle 100 may have seventy or more of the ECUs 306 that are positioned in various locations around the vehicle 100 and are communicatively coupled by the vehicle data bus 308. In the illustrated example, the ECUs 306 include a lighting control module 322, an engine control unit 324, and a door control unit 326. The lighting control module 322 operates the interior and/or exterior lights of the vehicle 100, the engine control unit 324 may control remote starting of an engine of the vehicle 100, and the door control unit 326 operates (e.g., locks, unlocks, primes) power locks of doors of the vehicle 100.

The vehicle data bus 308 communicatively couples the communication module 106, the GPS receiver 116, the body control module 302, the sensors 304, and the ECUs 306. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an EthernetTM bus protocol IEEE 802.3 (2002 onwards), etc.

Figure 4:
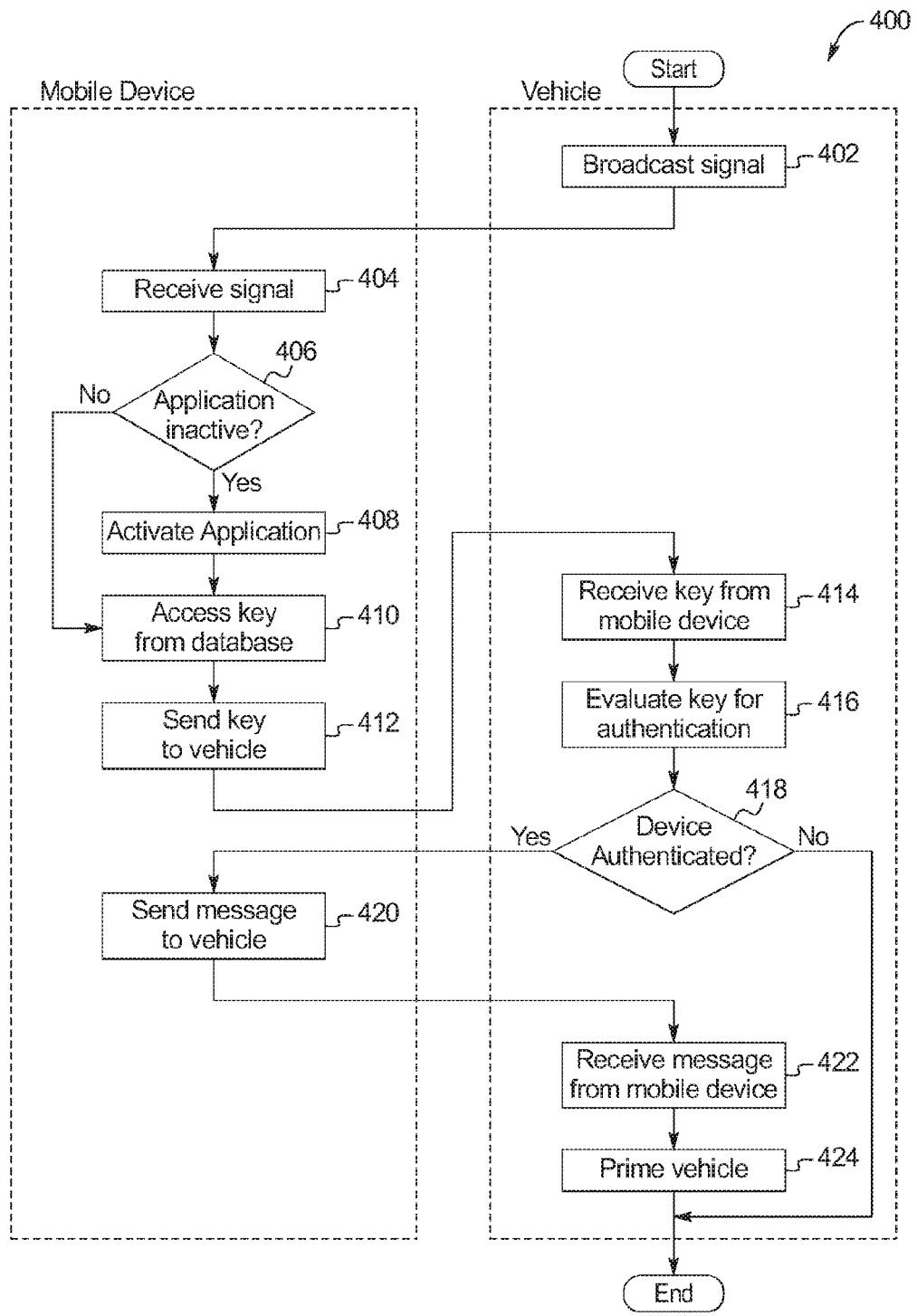
FIG. 4 is a flowchart of an example method to authenticate the mobile device of FIG. 1 for communication with the vehicle of FIG. 1.

FIG. 4 is a flowchart of an example method 400 to authenticate a mobile device for communication with a vehicle. The flowchart of FIG. 4 is representative of machine readable instructions that are stored in memory (such as the memory 204 of FIG. 2 and/or the memory 312 of FIG. 3) and include one or more programs which, when executed by a processor (such as the processor 202 of FIG. 2 and/or the processor 310 of FIG. 3), cause the vehicle 100 to implement the example key accessor 214 of FIG. 2 and/or the example device authenticator 118 of FIGS. 1 and 3. While the example program is described with reference to the flowchart illustrated in FIG. 4, many other methods of implementing the example key accessor 214 and/or the device authenticator 118 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the communication module 106 of the vehicle 100 broadcasts the signal (e.g., the beacon 110). At block 404, the communication module 210 of the mobile device 104 receives the signal when the mobile device 104 is within the proximity range 108 of the vehicle 100. In other examples, the signal associated with the vehicle 100 is a geosense signal that the GPS receiver 212 of the mobile device 104 receives when the mobile device 104 is within the proximity range 108 of the vehicle 100 as determined via the GPS receiver 116 of the vehicle 100.

At block 406, the key accessor 214 of the mobile device 104 determines whether the application for accessing digital keys is inactive. If the application is inactive, the key accessor 214 activates the application utilizing the signal associated with the vehicle as a prompt (block 408). If the application is activated at block 406 and/or upon activating the application at block 408, the key accessor 214 accesses the key 112 from a database. In some examples, the key accessor 214 accesses the key 112 from the database 206 of the mobile device 104. In other examples, the key accessor 214 accesses the key 112 from a database from a network (e.g., the Internet) via the communication module 208. At block 412, the key accessor 214 sends the key 112, via the communication module 210 of the mobile device 104, to the communication module 106 of the vehicle 100. In some examples, the key accessor 214 activates the application at block 406, accesses the key 112 at block 410, and/or sends the key 112 to the vehicle 100 without while the mobile device 104 remains in a locked mode without user interaction between the user 102 and the mobile device 104.

At block 414, the communication module 106 of the vehicle 100 receives the key 112 from the communication module 210 of the mobile device 104. At block 416, the device authenticator 118 of the vehicle 100 evaluates the key 112 for authentication. For example, the device authenticator 118 evaluates the key 112 by comparing the key 112 to key entries of the database 314 that is accessible to the device authenticator 118. In other examples, the device authenticator 118 evaluates the key 112 by hashing the key 112 into a hashed key and comparing the hashed key to the key entries of the database 314. At block 418, the device authenticator 118 determines whether the mobile device 104 is authenticated. If the key 112 sent by the mobile device 104 does not correspond to one of the key entries of the database 314, the method 400 ends.

If the key 112 corresponds to one of the key entries of the database 314, the method continues to block 420 at which the communication module 210 of the mobile device 104 sends the message 114 to communication module 106 of the vehicle 100. For example, the message 114 includes instructions for priming the vehicle 100 for entry by the user 102. At block 422, the communication module 106 of the vehicle 100 receives the message 114 from the communication module 210 of the mobile device 104. At block 424, the vehicle 100 is primed for entry by the user 102 based on the instructions included in the message 114.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A mobile device for vehicle communication authentication, the mobile device comprising:
    a communication module to receive a signal from a vehicle;
    memory including an application for accessing digital keys; and
    a key accessor to:
        activate, in response to determining the application is inactive, the application utilizing the signal;
        access a key from a database via the application; and
        send the key to the vehicle via the communication module.

2. The mobile device of claim 1, wherein the key accessor accesses the key from a network via a second communication module.

3. The mobile device of claim 1, wherein the signal is a low-energy beacon and the communication module is a short-range wireless module that receives the low-energy beacon when the mobile device is within a proximity range of the vehicle.

4. The mobile device of claim 1, further including the database, the database including key entries.

5. The mobile device of claim 1, wherein the key accessor accesses and the communication module sends the key when the mobile device is in a locked mode.

6. The mobile device of claim 5, wherein the key accessor activates the application when the mobile device is in the locked mode.

7. A method comprising:
    receiving a signal associated with a vehicle on a mobile device;
    determining, via a processor, whether an application for accessing a key is active on the mobile device;
    activating, in response to determining the application is inactive, the application utilizing the signal without user interaction with the mobile device when the mobile device is in a locked mode;
    accessing the key via the application; and
    sending the key to the vehicle.

8. The method of claim 7, wherein receiving the signal associated with the vehicle includes receiving a low-energy beacon broadcasted by the vehicle when the mobile device is within a proximity range of the vehicle.

9. The method of claim 7, wherein receiving the signal associated with the vehicle includes receiving a received signal strength indicator from the mobile device when the mobile device is within a proximity range of the vehicle.

10. The method of claim 7, wherein accessing the key includes accessing a database from a network via a communication module of the mobile device.

11. The method of claim 7, wherein accessing and sending the key includes accessing and sending the key without user interaction with the mobile device when the mobile device is in the locked mode.

12. A system comprising:
    a mobile device to:
        receive a signal;
        activate, responsive to determining an application for accessing keys is inactive, the application utilizing the signal without user interaction when in a locked mode; and
        access a key via the application; and
    a vehicle to:
        broadcast the signal;
        receive the key from the mobile device; and determine whether to authenticate the mobile device based on the key.

13. The system of claim 12, wherein the signal is a low-energy beacon that the mobile device receives when the mobile device is within a proximity range of the vehicle.

14. The system of claim 12, wherein the mobile device activates the application without user interaction with when in an unlocked mode.

15. The system of claim 12, wherein the mobile device is to access the key and send the key to the vehicle without user interaction when in the locked mode.

16. The system of claim 12, wherein the vehicle authenticates the mobile device for communication between the mobile device and the vehicle.

17. The system of claim 16, wherein, upon authenticating the mobile device, the vehicle receives a message from the mobile device to prime the vehicle for passive entry by an approaching user.

18. The system of claim 12, wherein the vehicle includes a device authenticator that evaluates the key received from the mobile device to determine whether to authenticate the mobile device.

19. The system of claim 18, wherein the device authenticator is to:
  compare the key to key entries of a database; and
  authenticate the mobile device when the key matches one of the key entries of the database.

20. The system of claim 18, wherein the device authenticator is to:
  hash the key received from the mobile device to produce a hashed key;
  compare the hashed key to key entries of a database; and
  authenticate the mobile device when the hashed key matches one of the key entries of the database.

* * * * *